J. J. CUNNINGHAM.
LOCKING MECHANISM FOR STOP COCK BOXES.
APPLICATION FILED SEPT. 20, 1912.
1,209,562.
Patented Dec. 19, 1916.
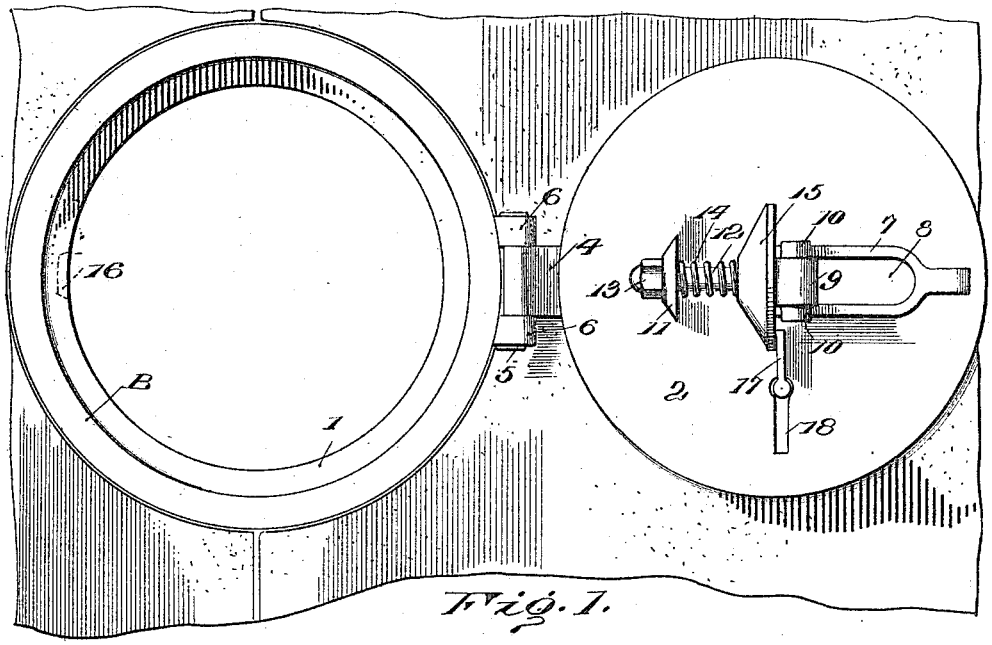
Fig. 1.
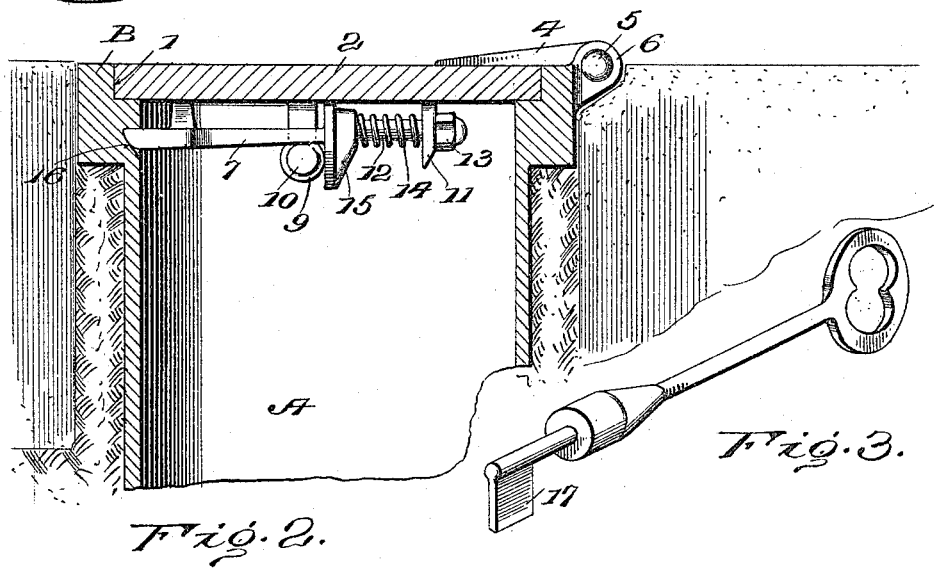
Fig. 2.
Fig. 3.
Witnesses
W. A. Williams
A. A. Hammond
Inventor
John J. Cunningham
By Vernon E. Hodges
his Attorney

UNITED STATES PATENT OFFICE.

JOHN J. CUNNINGHAM, OF GADSDEN, ALABAMA.

LOCKING MECHANISM FOR STOP-COCK BOXES.

1,209,562.

Specification of Letters Patent.   Patented Dec. 19, 1916.

Application filed September 20, 1912.   Serial No. 721,447.

*To all whom it may concern:*

Be it known that I, JOHN J. CUNNINGHAM, a citizen of the United States, residing at Gadsden, in county of Etowah and State of Alabama, have invented certain new and useful Improvements in Locking Mechanisms for Stop-Cock Boxes, of which the following is a specification.

My invention relates to an improvement in covers for stop cock boxes, and the object is to provide means whereby the lid or cover, when seated in the bell end of the pipe, will be locked therein so that it cannot be removed without the insertion of a key for releasing the fastening means.

This invention consists of certain novel features of construction and combinations of parts which will be hereinafter described and pointed out in the claim.

In the accompanying drawings—Figure 1 is a plan view of the cover open, showing the locking means applied thereto; Fig. 2 is a vertical sectional view showing the cover in locked position; Fig. 3 is a detail view of the key.

A represents the pipe, and B is the bell which is provided with an annular recess 1 in the top thereof in which recess the cover 2 is mounted, the cover being hinged to the bell by a strap 4 which is connected to the cover. Trunnions 5 on the strap are received in sockets 6 connected to the bell B. Mounted upon the inner surface of the cover is a bolt 7 which is provided with an elongated slot 8 through which a pin 9 projects from the cover and which is provided with lugs 10 which engage the sides of the bolt for holding them upon the cover.

A bracket 11 is mounted upon the cover through which a stem 12 formed on the bolt protrudes and a nut 13 is screwed upon the stem for fastening the stem and bolt to the bracket. A coil spring 14 surrounds the stem and is located between the bracket and the shoulder 15 formed on the bolt for normally holding the bolt at its outermost position.

An opening or keeper 16 is formed in the wall of the pipe beneath the recess 1 in which the bolt is adapted to be sprung when the cover is drawn to its closed position so that the cover is automatically locked in position and forced into the recess. The key 17 shown in Fig. 2 is adapted to be inserted in a key hole slot 18 in the cover and engages the shoulder 15 for withdrawing the bolt from engagement with the keeper when it is desired to raise the cover, for the purpose of inserting a tool into the pipe when it is desired to turn on or cut off the supply passing through the main.

Having thus described my invention, what I claim as new and desire to secure by Letters Patent is—

A locking mechanism for stop-cock boxes comprising a cover, a bolt mounted upon the inner surface of the cover, said bolt provided with an elongated slot, a pin projecting from the cover through said slot, said pin provided with a central portion substantially coinciding with said slot in thickness and with laterally extending lugs of less diameter which support the sides of the bolt, a bracket secured to the cover through which the stem of the bolt slides, a shoulder secured on the bolt, a spring mounted on the stem of the bolt between the shoulder and bracket, said shoulder resting against the pin as a stop in its normal position and a key adapted to turn in the cover in contact with the shoulder whereby to withdraw the bolt and unlock the cover.

In testimony whereof I affix my signature in the presence of two witnesses.

JOHN J. CUNNINGHAM.

Witnesses:
F. G. MCBROOM,
JAS. D. GILES.

Copies of this patent may be obtained for five cents each, by addressing the "Commissioner of Patents, Washington, D. C."